(12) United States Patent
Wu

(10) Patent No.: US 7,110,251 B2
(45) Date of Patent: Sep. 19, 2006

(54) MOUNTING DEVICE FOR MOUNTING EXPANSION CARDS IN COMPUTER ENCLOSURE

(75) Inventor: Pin-Shian Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 34 days.

(21) Appl. No.: 10/946,971

(22) Filed: Sep. 21, 2004

(65) Prior Publication Data
US 2005/0111179 A1 May 26, 2005

(30) Foreign Application Priority Data
Nov. 21, 2003 (TW) .............................. 92220587 U

(51) Int. Cl.
*H05K 5/00* (2006.01)
*H05K 7/14* (2006.01)

(52) U.S. Cl. .................... 361/685; 361/801; 248/674; 312/223.2

(58) Field of Classification Search ........ 361/679–687, 361/724–727, 801; 211/13.1, 181.1; 248/674, 248/27.1; 312/223.1–223.6, 265.6
See application file for complete search history.

(56) References Cited

U.S. PATENT DOCUMENTS

| 4,745,524 A | 5/1988 | Patton, III |
| 5,317,483 A | 5/1994 | Swindler |
| 5,936,835 A * | 8/1999 | Astier ........................ 361/683 |
| 6,182,835 B1 * | 2/2001 | Chen ........................ 211/13.1 |
| 6,608,765 B1 | 8/2003 | Vier et al. |

FOREIGN PATENT DOCUMENTS

| TW | 89209215 | 11/2001 |
| TW | 89216651 | 4/2002 |

\* cited by examiner

*Primary Examiner*—Hung Van Duong
(74) *Attorney, Agent, or Firm*—Wei Te Chung

(57) ABSTRACT

A mounting device (10) is for mounting a plurality of expansion cards with cover plates (30) to a card cage (60) of a rear panel (80). Each cover plate includes an elongated portion (32) and a bent portion (34). The mounting device includes an elongated main body (12) with one end pivotally engaging in a mounting hole (84) of the rear panel, and a locking arm (14) extending from the other end of the main body. A plurality of resilient fingers (122) is formed from an inner face of the main body for pressing the bent portions of the cover plate. A block (144) is formed from an inner surface of the locking arm corresponding to a locking hole (682) of the card cage. Rotate the locking arm to lock the block to the hocking hole, thus the cover plates are secured to the card cage.

19 Claims, 3 Drawing Sheets

MOUNTING DEVICE FOR MOUNTING EXPANSION CARDS IN COMPUTER ENCLOSURE

BACKGROUND OF THE INVENTION

1. Field of the invention

The present invention relates to a mounting device for mounting expansion cards in a computer enclosure, and particularly to a mounting device which readily secures a plurality of expansion cards in a computer enclosure and allows convenient removal of the expansion cards therefrom.

2. Description of the related art

In order to upgrade the operating capabilities of a personal computer, a plurality of expansion cards is operatively installed in the computer enclosure. Typical types of expansion cards include network cards, sound cards, graphics accelerator cards and multi-media cards, etc. These expansion cards may be installed in the computer enclosure during its original manufacture or by the computer purchaser.

U.S. Pat. No. 4,745,524 discloses a plurality of mounting systems for mounting a plurality of expansion cards inside a computer chassis. Each mounting system includes a pressing element and a screw to secure a separate cover plate of a corresponding expansion card. However, installing screws one by one is time-consuming and cumbersome. Moreover, during installation/removal of the expansion cards, one or more of the screws can easily fall into the crowded interior of the computer, thereby creating a difficult retrieval problem.

Another conventional mounting device is disclosed in U.S. Pat. No. 5,317,483. The mounting device includes an elongated locking bar with one end rotatably connected to a rear panel of the computer enclosure, and the other end movably secured to the rear panel, therefore a plurality of cover plates is pressed by the locking bar. However, said other end of the locking bar is secured to the rear panel by a fixing screw which increases inconvenience in installation/removal process. Additionally, because the locking bar is flat and slim, and the series of cover plates might be on different heights, the locking bar will fail to press on the cover plates which are on a lower position. Therefore, the untouched, lower positioned cover plates might not be securely attached to the rear panel. When suffered from shock or vibration, the cover plates will easily break away from the rear panel.

Thus an improved mounting device which overcomes the above-mentioned problems is desired.

BRIEF SUMMARY OF THE INVENTION

Accordingly, an object of the present invention is to provide a mounting device which readily and conveniently attaches a series of expansion cards to a computer enclosure, and allows ready detachment therefrom.

Another object of the present invention is to provide a mounting device which permits simultaneously locking or unlocking of all expansion cards.

A further object of the present invention is to provide a mounting device which can securely lock the series of expansion cards on different height.

To achieve the above-mentioned objects, a mounting device of the preferred embodiment of the present invention is used for mounting a plurality of expansion cards with cover plates to a card cage of a rear panel. Each cover plate includes an elongated portion and a bent portion. The mounting device includes an elongated main body with one end pivotally engaging in a mounting hole of the rear panel, and a locking arm extending from the other end of the main body. A plurality of resilient fingers is formed from an inner face of the main body for pressing the bent portions of the cover plate. A block is formed from an inner surface of the locking arm corresponding to a locking hole of the card cage. Rotate the locking arm to lock the block to the hocking hole, thus the cover plates are secured to the card cage.

Other objects, advantages and novel features of the present invention will be drawn from the following detailed description of the preferred embodiments of the present invention with the attached drawings, in which:

DETAILED DESCRIPTION OF THE INVENTION

Figure 1:
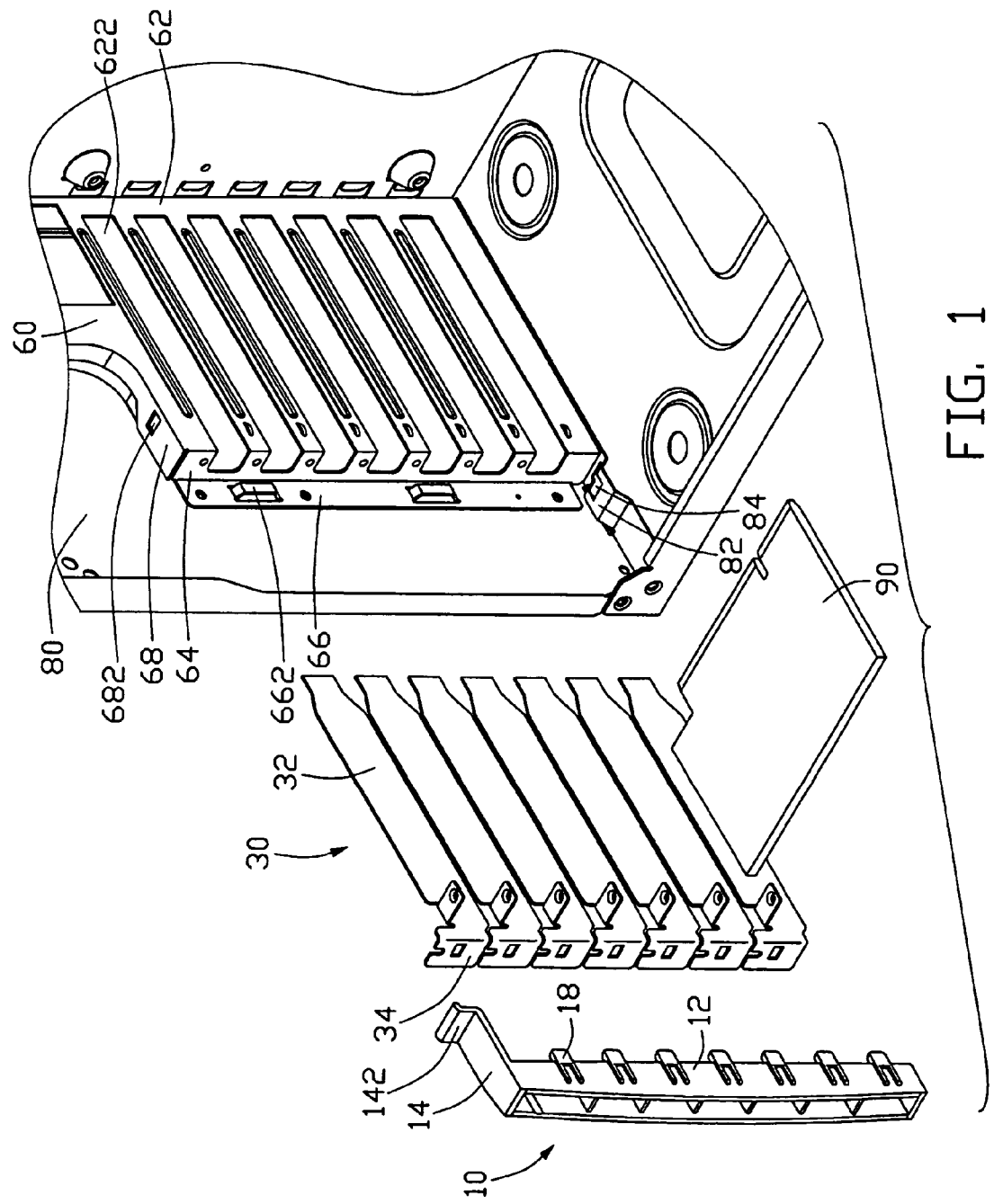
FIG. 1 is an exploded, isometric view of a mounting device in accordance with the preferred embodiment of the present invention, together with a plurality of cover plates for expansion cards, and an computer enclosure.
Figure 2:
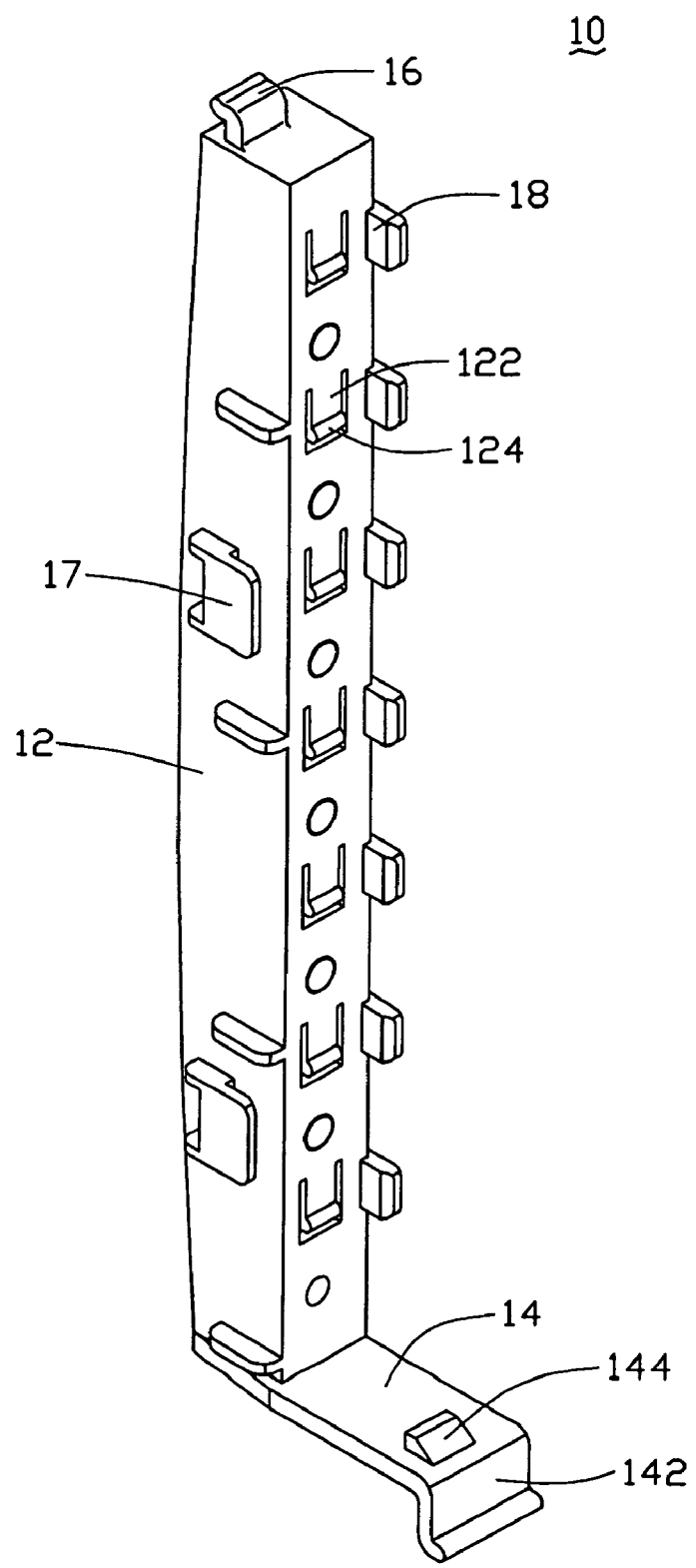
FIG. 2 is an enlarged view of the mounting device of FIG. 1.
Figure 3:
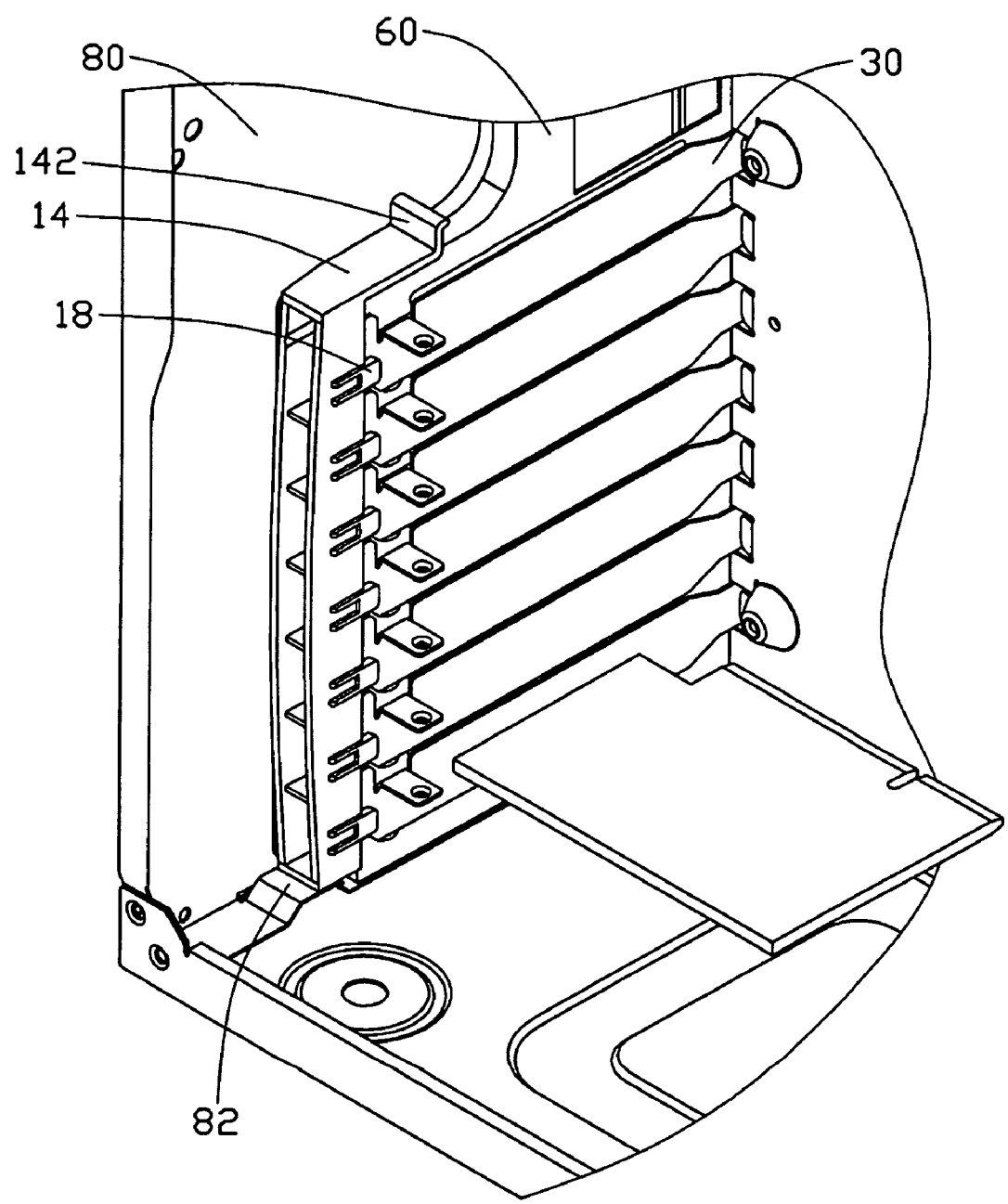
FIG. 3 an assembled view of FIG. 1.

Referring to FIGS. 1–3, a mounting device 10 in accordance with the preferred embodiment of the present invention is used to fix a plurality of expansion cards 90 with cover plates 30 to an inturned card cage 60 which is attached to a rear panel 80 of a computer enclosure. Each cover plate 30 comprises a rectangular elongated portion 32 connected to the expansion card 90, and a bent portion 34 extending perpendicularly from one end of the elongated portion 32.

The card cage 60 comprises a base wall 62, and a side wall 64 and a top wall 68 extending from the base wall 62. A plurality of expansion card slots 622 is defined horizontally in the base wall 62, and further extends to the side wall 64, having a similar profile with the cover plates 30. A rectangular locking hole 682 is defined in the top wall 68. The side wall 64 is further bent to form a bent plate 66 to be attached to the rear panel 80. A pair of retaining strips 662 is stamped inwardly from the bent plate 66. The rear panel 80 has an inturned bottom flange. An upwardly stamped mounting portion 82 is formed from the bottom flange in the vicinity of the side wall 64 of the card cage 60. A rectangular mounting hole 84 is defined in the mounting portion 82.

The mounting device 10 comprises an elongated main body 12, and a locking arm 14 extending perpendicularly from one end of the main body 12. A distal end of the locking arm 14 is bent outwardly to form a handle 142 for facilitating manual operation. A wedge-shaped block 144 is formed from an inner side of the locking arm 14 in the vicinity of the handle 142, corresponding to the locking hole 682 of the card cage 60. An L-shaped hook 16 is formed from the other end of the main body 12, and extends in a direction opposite to the direction in which the locking arm 14 extends. The main body 12 has an inner face corresponding to the bent portions 34 of the cover plates 30. A plurality of evenly spaced resilient fingers 122 are stamped to form in the inner face. Each resilient finger 122 is a cantilever, having a protrusion 124 formed at a free end thereof for pressing the bent portion 34 of a corresponding cover plate 30. One lateral side of the main body 12 extends a plurality of pressing tabs 18 for pressing or abutting against the elongated portions 32 of the cover plates 30. The other lateral side of the main body 12 has a pair of L-shaped retaining blocks 17 extending therefrom, for engaging with the retaining portions 662 of card cage 60.

In assembly, the hook 16 of the mounting device 10 is inserted in the mounting hole 84 of the rear panel 80, therefore the mounting device 10 can pivot around the hook 14. Then the cover plates 30 with expansion cards 90 are attached to the slots 622 of the card cage 60. Draw the handle 142 to rotate the mounting device 10, so that the block 144 of the locking arm 14 engages in the locking hole 682 of the top wall 68 of the card cage 60. Simultaneously, the retaining blocks 17 of the mounting device 10 engage with the retaining portions 662 of the card cage 60; the protrusions 124 of the resilient fingers 122 of the mounting device 10 are pressing the bent portion 34 of the cover plates 30; the pressing tabs 18 of the mounting device 10 are abutting against the elongated portions 32 of the cover plates 30. Thus, all the cover plates 30 are securely attached to the slots 622 of the card cage 60.

In disassembly, simply draw the handle 142 upwardly to disengage the block 144 from the locking hole 682, and rotate the mounting device 10 away the card cage 60, then the cover plates 30 together with the expansion cards 90 can be easily taken away from the card cage 60. During the disassembly process, the mounting device 10 is connected in the mounting hole 84, therefore, when the cover plates 30 are attached to the slots 622 again, simply rotate the mounting device 10 towards the card cage 60 and engage the block 144 in the locking hole 682 to complete assembly. The whole process is convenient, simple, and can decrease cost and save manpower.

Because the height of the expansion cards might not be uniform, the bent portions 34 of the cover plates 30 might not be coplanar. The resilient fingers 122 of the mounting device 10 can offset the different levels of the bent portions 34 of the cover plates 30, thereby tightly pressing the cover plates 30 to the card cage 60.

The mounting device 10 of the present invention can be pivotally attached to the bottom of the rear panel 80 by other means, and can also be pivotally attached to other places other than the rear panel. For example, the mounting device 10 can be directly attached to a bottom panel of the computer enclosure or a bottom portion of the card cage 60.

The card cage 60 of the present invention can be integrally formed from the rear panel 80 of the computer enclosure.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A mounting assembly for mounting a plurality of expansion cards with cover plates to a computer enclosure, each of the cover plates having an elongated portion and a bent portion, the mounting assembly comprising:
    a rear panel having a card cage, the card cage comprising a base wall to support the cover plates, a side wall, and a top wall, the top wall defining a locking hole therein, the side wall further forming a bent plate with at least one retaining portion formed thereon; and
    a mounting device having one end pivotally attached to the computer enclosure, the mounting device comprising an elongated main body and a locking arm, the locking arm forming a block to engage in the locking hole of the card cage, one lateral side of the main body having at least one retaining block to engage with said retaining portion of the card cage;
    wherein said one end of the mounting device forms a hook for pivotally engaging with the computer enclosure, the rear panel has an inturned flange, an upwardly stamped mounting portion is formed from the flange, a mounting hole is defined in the mounting portion for pivotally accommodating the hook of the mounting device therein.

2. The mounting assembly as described in claim 1, wherein the main body of the mounting device has an inner face corresponding to the bent portions of the cover plates, a plurality of resilient fingers is formed at the inner face of the main body.

3. The mounting assembly as described in claim 1, wherein the other lateral side of the main body forms a plurality of pressing tabs to abut against the elongated portions of the cover plates.

4. The mounting assembly as described in claim 1, wherein the bent plate of the card cage is intimately attached to the rear panel, said retaining portion is inwardly formed from the bent plate.

5. The mounting assembly as described in claim 1, wherein the block of the locking arm is generally wedge-shaped, and is formed inwardly from an inner surface of the locking arm.

6. The mounting assembly as described in claim 1, wherein a handle is bent outwardly from a distal end of the locking arm, for facilitating manual gripping thereof.

7. The mounting assembly as described in claim 2, wherein the resilient fingers are cantilever like, a protrusion is fond at an end of each of the resilient fingers and extends towards the bent portion of a corresponding cover plate.

8. The mounting assembly as described in claim 4, wherein said retaining block of the mourning device is generally L-shaped, and engages with said retaining portion of the card cage.

9. A mounting assembly for mounting a plurality of expansion cards with cover plates to a computer enclosure, each of the cover plates having an elongated portion and a bent potion, the mounting assembly comprising:
    a rear panel having a card cage, the card cage comprising a base wall to support the cover plates, a side wall and a top wall, the side wall further extending to form a bent plate to be attached to the rear panel, at least one retaining portion being formed inwardly from the bent plate; and
    a mounting device having one end pivotally attached to the computer enclosure in a place near a lower portion of the side wall of the card cage, the mounting device having an inner face with a plurality of resilient fingers defined therein, a protrusion formed at each of the resilient fingers, a retaining block formed at one lateral side of the mounting device corresponding to said retaining portion; wherein
    the mounting device is pivoted between a released position in which the cover plates can be freely attached to or removed from the card cage, and a locked position in which the resilient fingers resiliently presses the bent portions of the cover plates, and said retaining block engages with said retaining portion of the card cage.

10. The mounting assembly as described in claim 9, wherein said one end of the mounting device forms a hook for pivotally engaging with the computer enclosure.

11. The mounting assembly as described in claim 9, wherein the mounting device comprises an elongated main body and a locking arm extending perpendicularly from an end of the main body opposite to the pivot end.

12. The mounting assembly as described in claim 9, wherein each of the resilient fingers is cantilever like, and forms a protrusion at a free end thereof.

13. The mounting assembly as described in claim 9, wherein a plurality of pressing tabs is formed from the other lateral side of the mounting device to abut against the elongated portions of the cover plates.

14. The mounting assembly as described in claim 9, wherein said retaining block of the mounting device is generally L-shaped to engage in said retaining portion.

15. The mounting assembly as described in claim 10, wherein the rear panel has an inturned flange, an upwardly stamped mounting portion is formed from the flange, a mounting hole is defined in the mounting portion for pivotally accommodating the hook of the mounting device therein.

16. The mounting assembly as described in claim 11, wherein the top wall of the card cage defines a locking hole, an inner surface of the locking arm forms a block to engage in the locking hole.

17. The mounting assembly as described in claim 11, wherein a free end of the locking arm is bent outwardly to form a handle.

18. A mounting assembly for mounting a plurality of expansion cards with cover plates to a computer enclosure, each of the cover plates having an elongated portion and a bent portion, the mounting assembly comprising:

a rear panel having a card cage, the card cage comprising a base wall for supporting the elongated portions of the cover plates, a side wall extending from one edge of the base wall and perpendicular to said base wall for supporting the bent portions of the cover plates, and a top wall extending from another edge of the base wall and perpendicular to both said base wall and said side wall; and a mounting device pivotally mounted adjacent to the side wall and defining pivotal and locking sections at two opposite ends thereof along a lengthwise direction of said mounting device so as to efficiently securing the mounting device to the card cage for preventing movement of said mounting device relative to the card cage in a lengthwise direction of said side wall when said mounting device is located a locked position; wherein the mounting device further includes a retaining device located between the opposite pivotal and locking sections and secured to the card cage to efficiently prevent movement of said mounting device relative to the card cage in a lateral direction of said side wall, which is perpendicular to both said lengthwise direction of the side wall and a lengthwise direction of said top wall, when said mounting device is located at the locked position.

19. The mounting assembly as described in claim 18, wherein said retaining device has been partially secured to the card cage before the mounting device completely reaches the locked position.

* * * * *